PROCESS OF FORMING COMPLEXING AGENTS FROM POLYALDEHYDO CARBOXYLIC ACIDS

Heinz Haschke, Grossauheim, and Erich Bäder, Hanau, Germany, assignors to Deutsche Gold- und Silber-Scheideanstalt vormals Roessler, Frankfurt am Main, Germany No Drawing. Continuation-in-part of applications Ser. No. 7,251, now Patent No. 3,686,145, and Ser. No. 7,252, both Jan. 30, 1970. This application Aug. 21, 1970, Ser. No. 66,078

Claims priority, application Germany, Aug. 21, 1969, P 19 42 556.0

Int. Cl. C02b 1/00

U.S. Cl. 252—180      4 Claims

ABSTRACT OF THE DISCLOSURE

Washing and cleansing compositions and degreasing, rust-removal and peroxide baths are formed by employing complexing agents formed of straight, substantially not cross-linked oligomers or polymers of which the main chain predominantly comprises C—C bonds and which include (a) carboxyl or carboxylate groups in a molar content of at least 50%, and (b) carbonyl groups in a molar content of at most 50%. The oligomers-polymers may also contain free or partially or completely lactonized hydroxyl groups in a molar content of at most 66.6%. The polymerization degree of the complexing agents is between 3 and 500. The molar content percentages are to be understood here as relating to the mean number of said groups per hundred monomer units in the oligomer or polymer.

CROSS-REFERENCES TO RELATED APPLICATIONS

The present application is a continuation-in-part of application Ser. Nos. 7,251, now Pat. No. 3,686,145 and 7,252, filed by the same inventors on Jan. 30, 1970. The first-named application related to "Hydroxycarboxylic Acid Polymers" and the second application related to "Process of Forming Complexes By Means of Hydroxy-Carboxylic Acid Polymers as Complexing Agents."

BACKGROUND OF THE INVENTION

This invention relates to the use of oligomers and polymers as complexing agents in washing and cleansing compositions and degreasing, rust removal and peroxide baths and similar applications.

Many different compounds have been used in the past as complexing agents. Most of these compounds are nitrogen, phosphorus- or sulfur-containing compounds, examples for inorganic complexing agents are the borates, phosphates, silicates, etc. Examples of organic complexing agents are compounds such as nitrilotriacetic acid, ethylenediamine-tetra-acetic acid, diethylenetriaminepentaacetic acid, N-oxyethyl-ethylenediaminetriacetic acid, polyalkylene-polyamine-N-polycarboxylic acid, and di- and polyphosphonic acids.

Complexing agents of this type are for instance used in large amounts in rinsing media, detergents, wash aids and cleansing agents as well as in the wood bleaching and textile bleaching industries. The use of these complexing agents, however, frequently involves various shortcomings. For instance, difficulties arise with nitrogen-, phosphorus- or sulfur-containing compounds because of the resulting uncontrolled algae growth in the sewage water. The polyphosphates, furthermore, had a tendency to hydrolize so as to form compounds with low complexing properties which results in undesirable precipitates.

In many cases the corrosion effect in respect of metals, for instance aluminum, is also of importance. There are, in addition, limits to the use of these agents due to the type and capacity of their bonding action (Chem. Ind. XX, September 1968, p. 608).

It is also well known that citric acid may form complexes with calcium ions (see Gmelin, Part B, third issue, p. 1402). This compound has never found any use in industry.

Textile aids have also been used which are homo- or copolymerizates of unsaturated aldehydes, for instance of acrolein, and which have a plurality of units of the formula

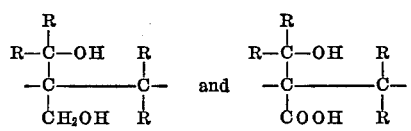

While these polymerizates, on principle, are capable of forming chelates with a few metal ions, they likewise have not been accepted in industry because they were not useful for commercial applications (Belgian Pat. 611,797). The complexes produced by these complexing agents with metal ions have only an extremely low stability and their solubility is not always satisfactory.

The present invention, therefore, has the object of sequestering metal ions by forming metal ion complexes, in particular, for the uses above stated which will not be subject to the shortcomings of the prior-art complexing agents.

SUMMARY OF THE INVENTION

The invention resides in the use of specific complexing agents for washing and cleansing compositions and degreasing, rust removal and peroxide baths and similar applications. The complexing agents used in the process of the invention are straight, substantially not cross-linked oligomers or polymers of which the main chain predominantly comprises C—C bonds and which include (a) carboxyl or carboxylate groups in a molar content of at least 50% and (b) carbonyl groups in a molar content of at most 50%. The compounds may also include free or partially or completely lactonized hydroxyl terminal groups at a molar content of at most 66.6%. All molar content percentages in this connection relate to the mean number of groups per hundred monomer units in the oligomer or polymer. The complexing agents employed in the invention have a polymerization degree between 3 and 500, preferably between 3 and 300, and most preferably between 3 and 100.

DETAILED DESCRIPTION OF THE INVENTION AND OF PREFERRED EMBODIMENTS

The described complexing agents may be used in the process of the invention as such, or they may be used in admixture with other polyhydroxycarboxylic acids or polymeric hydroxy compounds which are capable of constituting complexing agents. As such other polymeric hydroxy compounds, there may in particular be used polyvinyl alcohol and, furthermore, di-, oligo-, and polysaccharides, or the derivatives thereof.

Examples for such other suitable complexing agents in the form of polyhydroxycarboxylic acids are described, for instance, in the above-referred-to earlier U.S. application Ser. No. 7,252. These are polymers, which include carboxyl or carboxylate and hydroxyl groups, are straight or cross-linked and of which the main chain predominantly comprises C—C bonds. The relation of carboxyl or carboxylate groups to hydroxyl groups is between 1.1 and 16 and the minimum polymerization degree is 3. The polymers predominantly comprise units of the formulae

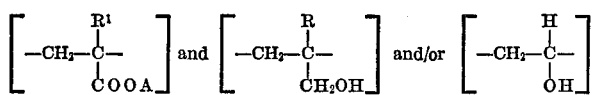

In addition, the polymers may also have a minor amount of units of the formulae

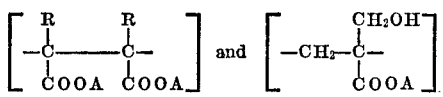

and/or

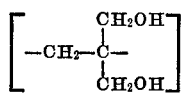

These polyhydroxycarboxylic acids can be added in amounts which correspond at most to one hydroxy group per carboxyl or carboxylate group. Particularly, the acid forms of the oligomers or polymers can also be used at the same time for neutralization and buffering purposes.

The oligomers or polymers used in the present process are particularly suited as complexing agents because they are virtually uncross-linked, that is cross-links formed because of side reactions exist only to a minor extent which is unsubstantial in connection for the particular use.

The compounds used in the process of the invention may also include a minor amount of side chains consisting of vinyl groups, which latter groups are without significance for the activity of the complexing agent.

The preferred complexing agents employed in the process of the present invention consist predominantly of units of the general formulae

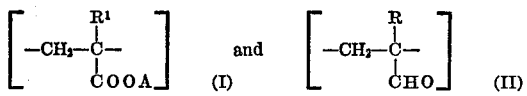

and, as already indicated, may include a minor amount of vinyl groups attached in side chains or units of the general formula

In these Formulae A is hydrogen, a valence of a mono- or polyvalent metal, particularly an alkali metal and preferably sodium, or is ammonium, and R and $R^1$ are the same or different and are alkyl of 1–6 carbon atoms, particularly methyl, or are preferably hydrogen, and $R^1$ in addition may also be halogen, preferably chlorine. The units (I), (II) and (III) may be arranged in random sequence. The mean frequency of these units is such as to provide a molar content of carboxyl or carboxylate groups of at least 50% and a molar content of carbonyl groups of at most 50%, and preferably of at least 10%. In addition, there may be present terminal groups consisting of free or partially or completely lactonized hydroxyl groups in an amount of a molar content of at most 66.6%. The polymerization degree, as already indicated, is between 3 and 500, particularly between 3 and 300, and preferably between 3 and 100. All percentage statements regarding the molar contents relate to the mean number of COOH, CO or OH groups per hundred monomer units of the oligomer or polymer. The units of type (II) may be in completely or partially hydrated form, or may be in form of a cyclic structure because of reactions with the neighboring groups. Thus, cyclic, acetal and also acylal structures may be included in these units, of the following formulae

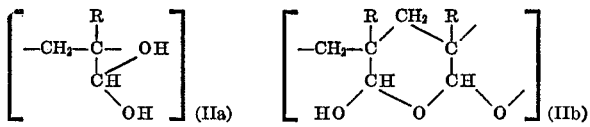

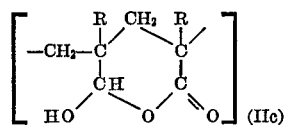

The specific structures just given are not of particular significance for use in the process of the invention since they interact with the simple open carbonyl structure (II) through their readily reversible equilibrium.

The oligomers or polymers of the invention can be formed by copolymerization of $\alpha,\beta$-unsaturated aldehydes with $\alpha,\beta$-unsaturated mono- and/or dicarboxylic acids in the presence of radical catalysts or redox catalysts and by partial oxidation of polyaldehydes such as polyacroleins or by partial Cannizzaro reaction of polyacroleins or polyaldehydo carboxylic acid esters as described in the above-referred-to earlier application 7,251.

Preferred is the formation by oxidative polymerization of $\alpha,\beta$-unsaturated aldehydes, preferably acrolein, or oxidative copolymerization of $\alpha,\beta$-unsaturated aldehydes with $\alpha,\beta$-unsaturated mono- or dicarboxylic acids, preferably acrylic acid or maleic acid or by oxidative terpolymerization of $\alpha,\beta$-unsaturated aldehydes with $\alpha,\beta$-unsaturated monocarboxylic acids and $\alpha,\beta$-unsaturated dicarboxylic acids. However, the polymerization conditions must be selected so that the required minimum carboxyl content, the required maximum carbonyl content, and, if required, the maximum hydroxyl groups content and the necessary polymerization degree is obtained.

As oxidizing agent and at the same time polymerization initiator peroxides or peracids may be used. Preferred is $H_2O_2$. The COOH and CO content of the polymers can be adjusted in the case of the oxidative polymerization by the amount employed, for instance, of acrolein, acrylic acid and oxidizing agent. Since the peroxide compounds act also as chain-length regulators, the polymerization degree and thus indirectly also the hydroxyl group content can be adjusted by the concentration or amounts of peroxides employed relative to the monomers.

With increasing amount of oxidizing agent, the degree of polymerization will decrease and conversely. For instance, with an $H_2O_2$ initial concentration of 20% and a ratio of $H_2O_2$ to acrolein of 1:1, an average polymerization degree of 3.2, a COOH content of 67%, a CO content of 14% and a hydroxyl content of about 15% is obtained. On the other hand, if under otherwise identical conditions an amount ratio of $H_2O_2$ to acrolein is chosen of 0.7:1, a polymerization degree of 13, a COOH content of 66%, a CO content of 21% and an OH content of about 7% is obtained. The polymerization is preferably carried out as solution polymerization. However, it can also be effected by way of precipitation polymerization or emulsion polymerization.

The oligomers or polymers which are obtained in this manner may include, as already indicated, a minor amount of vinyl groups in side chains in the form of units of the type

as well as side chains of the type

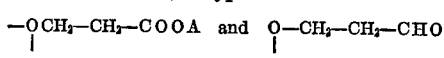

These latter groups are, however, all of no significance for the use involved in the process of the present invention.

The terminal groups, in addition to the mentioned carboxyl, carbonyl and $CH_2OH$ groups, we also believe to be semiacetal groups of the type

(V)

as well as vinyl groups or hydrogen atoms. They may for instance have the form of the following units

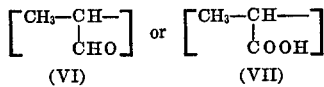

(VI)    (VII)

The terminal groups may also be residues of the catalyst employed. All these groups are likewise without significance for the use contemplated in the process of the invention.

The process of the invention contemplates the use of the defined aldehydo or hydroxyaldehydo carboxylic acids or salts thereof, if desired in admixture with other compounds, as indicated, for forming complexing agents in washing and cleansing compositions, in degreasing and rust removal baths. In the form of metal salts, particularly magnesium salts, they may be used in peroxide baths for peroxide stabilization; and as metal ion carriers and metal ion concentration modulators for agricultural purposes and quite generally as complexing agents. Their general properties are based on the ability of these acids or their salts to form complexes with metal ions. For instance in washing agents such as detergents they have the property of building up a complex structure in the same way as well known N- and/or P-containing complexing agents.

In general, the process of the invention may also be defined as a process for forming an aqueous solution or suspension containing an oligomer or polymer as defined, together with a material which in the solution or suspension furnishes at least one type of metal ions and then permitting the oligomer or polymer to react with the ions in the solution at a pH and at a temperature and for a time to cause formation of a water-soluble ionic complex.

The term "complexing agent" in the connection of the present invention is to be broadly understood. It should include also the purely electrostatic ion polyelectrolyte interchange which is analogous to an ion-exchange action (G. Jander and H. Wendt, Lahrbuch der analyt. und praep. anorg. Chemie, 3rd ed., pp. 23–29; Journal of Phys. Chem. 58 [1954], p. 1123).

The oligomers or polymers described can be used in the process of the invention as such or in the form of their salts. Occasionally it may be advisable for particular uses to add a small amount of a polymeric hydroxyl compound, preferably polyvinyl alcohol. This amount should provide up to a maximum of one half of an OH-group per carboxyl or carboxylate group in the mixture.

Since the oligomeric or polymeric aldehydo carboxylic or hydroxyaldehydo carboxylic compounds in their H-form (A=H) constitute weak acids, they can also be used at the same time for neutralizing alkaline solutions, particularly alkaline polyhydroxy carboxylic acid complexing agent solutions or as buffers for systems in which they are used as complexing agents.

The invention will be further illustrated in the following examples.

The "Hampshire Test" mentioned in some of the examples is described in the company publication of the Hampshire Chemical Corporation, of June 1960 "Hampshire NTA Technical Bulletin," Appendix S. A2. The test furnishes a measurement for the complexing ("builder") action of the product.

In this test, exactly 2 g. of a pulverulent complexing agent are dissolved in 50 ml. distilled water. The solution is neutralized, and 10 ml. of a 2% sodium carbonate solution are added. Then, the solution is adjusted to a pH between 11 and 12, and diluted to a volume of 100 ml. This is followed by titration with a calcium acetate solution which contains 44.1 g. of calcium acetaate monohydrate per liter until a distinct and permanent turbidity appears. The calcium carbonate bonding action of the complexing agent is calculated according to the following formula:

$$\frac{\text{Ml. calcium acetate solution} \times 25}{\text{Initial input of complexing agent}}$$

$= $ Mg. bonded $CaCO_3$/g of complexing agent

The individual stability of the several complexes as indicated in the examples was determined as follows:

(1) Determination of the stability with $Ca^{++}$

Measurement of the concentration of free $Ca^{++}$ in the equilibrium of the complex formations by means of the color complex between $Ca^{++}$ and the metal indicator dye "Eriochromblack T" by defining the complex stability constant as follows:

$$K_{stab} = \frac{[CaPADC]}{[Ca^{++}][PADC^{--}]}$$

In this equation $PADC^{--}$ stands for the anion of the polymeric aldehydo dicarboxylic acid used as complexing agent (a chain segment with 2 $COO^-$— groups which in the mean is homologous is considered for this purpose as a unit). The measurements were carried out in a solution buffered with $NH_4OH$—$NH_4Cl$ at a pH of 10 and an ionic strength of $I=0.24$ mol/l.

(2) Determination of the complex stability with $Fe^{+++}$

The measurement was effected by means of the solubility of $Fe(OH)_3$ in an ammoniacal solution at a pH of 11. The complex stability constant is defined as follows:

$$K_{stab} = \frac{[FePAC^{++}]}{[Fe^{+++}][PAC^-]}$$

$PAC^-$ in this equation stands for the anions of the polymeric aldehydo monocarboxylic acids which are used as complexing agents (a chain segment with one —$COO^-$ group which in the mean is homologous is considered a unit in this connection).

The measurement were effected at about a pH of 11 and relate to an ionic strength of $I=1.0$ mol/l.

EXAMPLE 1

427 g. of maleic acid anhydride was dissolved in 850 ml. distilled $H_2O$ and of 1100 ml. of 35% technical grade of $H_2O_2$. The mass was heated to 55° C. and stirred. 1170 ml. distilled acrolein were then added dropwise within a period of 5½ hours. The temperature of the bath was increased to 60° C. within the first 10 minutes of the dropwise addition and was maintained at this value up to 1 hour after completion of the addition. The reaction mixture was then permitted to cool, a small fraction of high molecular polymerizates was removed by suction, and the remaining filtrate was concentrated in a vacuum to a volume of 1330 ml. There was obtained an 83% concentration of a polyaldehydocarboxylic acid solution. The polymer had an average degree of polymerization of $\bar{P}=4$, a content of carboxyl groups of 50%, a content of carbonyl groups of 26% and a hydroxyl content, in the form of terminal groups, of 5%.

The product forms water-soluble complexes with almost all metal ions. The complexing capacity with $Ca^{++}$ ions, for instance, is characterized by a complexing stability constant represented by the common logarithm $$\lg K_{stab} = 1.8$$

The complexing activity appears furthermore from the Hampshire test value for the polyaldehydo carboxylic acid-Na salt which is 278.

EXAMPLE 2

A mixture was prepared of 90 ml. acrylic acid which had been stabilized with 0.5% hydroquinone and 1360 g. aqueous unstabilized crude acrolein solution containing about 30% acrolein in addition to small amounts of formaldehyde, acetalaldehyde and acetic acid. 1529 ml. of this mixture was added upon stirring to 660 ml. of a 30% concentration $H_2O_2$ in a period of about 3 hours, starting with a temperature of 50° C. The temperature of the mass was adjusted within the first 10 minutes of the addition to 60° C. After completion of the addition of the acrolein-acrylic acid mixture, stirring was continued for another period of about 3 hours at a bath temperature of 60° C. The mass was then permitted to cool and, after adding 80 mg. of $MnO_2$ in order to eliminate any possible $H_2O_2$ residue, the mass was then concentrated in vacuum to a volume of about 1100 ml. There was obtained a polyaldehydo carboxylic acid solution of a concentration of about 41%. The carboxylic acid had an average degree of polymerization of $\bar{P}=9$, a carboxyl groups content of 68%, a carbonyl groups content of 20%, a hydroxyl content of about 5%. It was suitable to serve as a complexing agent. For instance, complexes were formed with $Fe^{+++}$ ions characterized by the stability constant $$\lg K_{stab}^{Fe^{+++}} = 25.7$$

With $Ca^{++}$ ions the stability constant was $$\lg K_{stab}^{Ca^{++}} = 2.1$$

The Hampshire test value of the sodium salt of the polyaldehydocarboxylic acid was 395.

EXAMPLE 3

Polyaldehyo carboxylic acid was made in the same manner as in Example 2, employing a not unstabilized acrolein containing 0.3% hydroquinone. The acid had an average polymerization degree of $\bar{P}=18$, a COOH content of 80%, a carbonyl content of 20% and a hydroxyl terminal group content of 2%. Its complexing action was determined with $Ca^{++}$ and $Fe^{+++}$ ions. The stability constants expressed in the form of a common logarithm were as follows:

$$\lg K_{stab}^{Ca^{++}} = 2.2 \quad \lg K_{stab}^{Fe^{+++}} = 28.8$$

The Hampshire test value of the sodium salt of the polyaldehydo carboxylic acid was found to be 395.

EXAMPLE 4

A polyaldehydo carboxylic acid was formed by oxidative copolymerization of acrolein with acrylic acid in a process corresponding to the disclosure in Example 1. The acid had an average polymerization degree of $\bar{P}=50$, a carboxyl groups content of 80%, a carbonyl groups content of 20% and a hydroxyl content of 2%. Its complexing action was determined with $Ca^{++}$ and $Fe^{+++}$ ions. The stability constants were as follows:

$$\lg K_{stab}^{Ca^{++}} = 2.3 \quad \lg K_{stab}^{Fe^{+++}} = 29.4$$

The Hampshire test value of the sodium salt of the product was found to be 530.

EXAMPLE 5

A polyaldehydo carboxylic acid was formed in a process analogous to the process of the preceding examples. It had a mean polymerization degree of $\bar{P}=45$, a carboxyl content of 74%, a carbonyl content of 22% and a hydroxyl content in the form of terminal groups of about 2%. Its complexing activity was determined with metal ions as follows: The product formed complexes with $Ca^{++}$ ions characterized by a stability constant as follows:

$$\lg K_{stab}^{Ca^{++}} = 2.25$$

The Hampshire test value for the sodium salt of the carboxylic acid was 550. With $Fe^{+++}$ ions the complex stability constant was $$\lg K_{stab}^{Fe^{+++}} = 29.5$$

The formation of water-soluble complexes with still other metal ions was also determined by way of absence of precipitation of the ions with suitable precipitation agents under conditions where, without the presence of the polyaldehydo carboxylic acid sodium salt, a precipitation would have taken place.

For this purpose there was used in each case a mixture of 10 ml. 0.2 molar polyaldehydo carboxylic acid solution and 2 ml. of 1 molar NaOH, 28 ml. distilled $H_2O$ and 5 ml. of a salt solution containing about 0.1 mole. The mixture was effected under stirring. About 0.1 molar solution of the corresponding precipitation agent were then added upon stirring in an amount of 10 ml. in each case. In corresponding control tests with the same volume of distilled water instead of NaOH and polyaldehydo carboxylic acid solution the precipitation of the metal ions under the given conditions with the precipitation agent employed in each case was established.

The results of these tests appear in the following table:

| Metal ions: | With the complexing agent absence of precipitation of the following ions: |
|---|---|
| $Mg^{++}$ | $OH^-, F^-, CO_3^{--}$. |
| $Ba^{++}$ | $Oxalate^{--}, CO_3^{--}$. |
| $Tl^+$ | $BrO_3^-$. |
| $Ca^{++}$ | $OH^-, CO_3^{--}$. |
| $Cd^{++}$ | $OH^-, CO_3^{--}, oxalate^{--}$. |
| $La^{+++}$ | $CO_3^{--}$. |
| $Cr^{+++}$ | $PO_4^{---}$. |
| $Mn^{++}$ | $OH^-, CO_3^{--}, PO_4^{---}$. |
| $Co^{++}$ | $OH^-, CO_3^{--}, PO_4^{---}$. |
| $Ni^{++}$ | $OH^-, CO_3^{--}, PO_4^{---}$. |
| $Ag^+$ | In a sufficiently dilute solution (about $10^{-4}$ molar) no precipitation with $Cl^-$. |

EXAMPLE 6

A polyaldehydo carboxylic acid of average polymerization degree $\bar{P}=100$, carbonyl content of 21% and carboxyl content of 74% furnished the following stability constant with $Ca^{++}$ ions:

$$\lg K_{stab}^{Ca^{++}} = 2.4$$

Regarding the sodium salt, the Hampshire test value was 470.

EXAMPLE 7

A polyaldehydo carboxylic acid was formed by copolymerization of acrolein with acrylic acid. The acid had an average polymerization degree of $\bar{P}=260$, a carboxyl content of 75%, a carbonyl content of 17% and a hydroxyl content in the form of terminal groups of about 0.7%. The acid was active as complexing agent. For instance, the stability of the complexes with $Fe^{+++}$ ions showed the following stability constant:

$$\lg K_{stab}^{Fe^{+++}} = 29.4$$

The corresponding stability constant of the $Ca^{++}$ ion complex was as follows:

$$\lg K_{stab}^{Ca^{++}} = 2.1$$

The activity of the sodium salt was 354 determined by the Hampshire test value.

EXAMPLE 8

A polyhydroxycarboxylic acid complexing agent was formed as described in the earlier application Ser. No. 007,252 by means of a Cannizzaro reaction. The thus-obtained reaction solution was strongly alkaline (pH=13). The solution contained a 37% concentration of a polyoxycarboxylic acid sodium salt of an average polymerization degree of $\overline{P}=100$, a carboxylate content of 84%, and a hydroxyl content of 11%. In order to neutralize this solution a 24.6%-concentration aqueous solution of a polyaldehydocarboxylic acid as described in Example 6 of the present application was added. The thus-obtained neutral solution was concentrated up to obtaining a dry solid material. The thus-obtained mixture of complexing agents was tested regarding complexing activity with $Ca^{++}$ and $Fe^{+++}$ ions. The following stability constants were found, expressed below in the form of common logarithms $$\lg K_{stab}^{Ca^{++}} = 2.28 \quad \lg K_{stab}^{Fe^{+++}} = 29.4$$

The complexing activity by the Hampshire test value was 562.

EXAMPLE 9

A polyaldehydocarboxylic acid was formed of an average polymerization degree $\overline{P}=38$, a carbonyl content of 30% and a carboxyl content of 70%. The complexing activity with $Ca^{++}$ and $Fe^{+++}$ ions gave stability constants expressed in common logarithms as follows:

$$\lg K_{stab}^{Ca^{++}} = 2.3 \quad \lg K_{stab}^{Fe^{+++}} = 29.4$$

The Hampshire test value was 620 for the sodium salt.

EXAMPLE 10

A polyaldehydocarboxylic acid was formed having an average polymerization degree of $\overline{P}=14$, a carbonyl content of 16% and a carboxyl content of 73%. This acid tested with $Fe^{+++}$ ions showed a stability constant of $$\lg K_{stab}^{Fe^{+++}} = 28.6$$

The complexing capacity was also tested with $Ca^{++}$ ions and was measured by means of the Hampshire test value of the polyaldehydocarboxylic acid sodium salt. The value determined was 328.

EXAMPLE 11

A polyaldehydocarboxylic acid was formed by oxidative copolymerization of acrolein and maleic acid with hydrogen peroxide as polymerization catalyst and oxidizing agent. The acid had an average polymerization degree $\overline{P}=90$, a carbonyl content of 43% and a carboxyl content of 56%. It formed water-soluble complexes with most metal ions. The complexing capacity was determined by measuring the complexing with $Ca^{++}$ and $Fe^{+++}$ ions. The following stability constants were found:

$$\lg K_{stab}^{Ca^{++}} = 2.03 \quad \lg K_{stab}^{Fe^{+++}} = 26.95$$

The Hampshire test value of the sodium salt was 276.

EXAMPLE 12

An aqueous polyvinyl alcohol solution was added to an aqueous solution of a polyaldehydo carboxylic acid having an average polymerization degree of $\overline{P}=4.5$, a carbonyl content of 25% and a carboxyl content of 61% and a hydroxyl terminal group content of 8%. The alcohol was added in an amount to provide for 3 carboxyl groups of the acid for each hydroxyl group of the polyvinyl alcohol. The resulting solution was concentrated to dryness. The complexing stability constants were then determined with $Fe^{+++}$ and with $Ca^{++}$ ions and compared with the value for the polyaldehydocarboxylic acid to which no polyvinyl alcohol was added. The following values were found for the mixture of polyaldehydocarboxylic acid and polyvinyl alcohol:

$$\lg K^{Ca^{++}} = 1.96 \quad \lg K^{Fe^{+++}} = 27.95$$

The Hampshire test value was 392.

The comparative values for the polyaldehydo carboxylic acid without polyvinyl alcohol was $$\lg K^{Fe^{+++}} = 27.6$$

and a Hampshire Test value of 367.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process of sequestering metal ions in the form of a complex which comprises adding to a solution containing metal ions that are to be sequestered a polymer composed predominantly of two repeating units having the formulae:

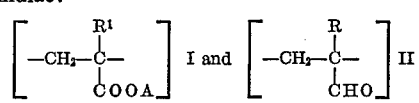

or units having the Formulae I and II together with minor amounts of repeating units having the formula:

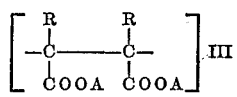

in which formulae A is a hydrogen, ammonium, or an alkali-metal radical, R is a radical of the group consisting of hydrogen and alkyl radicals containing up to 6 carbon atoms and $R^1$ is a chlorine or a radical of the group represented by R, the said repeating units being randomly distributed and the average frequency of such units in the polymer corresponding to a molecular proportion of at least 50% carboxyl or carboxylate radicals and at most 50% carbonyl radicals, the polymer having a degree of polymerization between 3 and 300 and the said molecular proportion relating to the mean number of radicals per 100 repeating units in the polymer and the amount of the polymer being sufficient to sequester the metal ions in the solution.

2. The process of claim 1, wherein the polymerization degree of said polymers is between 3 and 100.

3. The process of claim 1, wherein the alkali metal is sodium.

4. The process of claim 1, wherein alkyl represented by R or $R^1$ is methyl.

References Cited

UNITED STATES PATENTS

| | | | |
|---|---|---|---|
| 3,474,062 | 10/1969 | Smith et al. | 260—30.4 |
| 3,455,882 | 7/1969 | Hartel et al. | 260—67 |
| 3,346,504 | 10/1967 | Herrmann | 252—137 |
| 3,227,688 | 1/1966 | Kern et al. | 260—67 |
| 3,375,217 | 3/1968 | Smith et al. | 260—30.4 |
| 3,387,029 | 6/1968 | Hartel et al. | 260—530 |
| 3,438,941 | 4/1969 | Kekish | 260—67 |

FOREIGN PATENTS

| | | |
|---|---|---|
| 967,597 | 8/1964 | Canada. |

LEON D. ROSDOL, Primary Examiner

P. E. WILLIS, Assistant Examiner

U.S. Cl. X.R.

252—89, 252—DIG. 11